United States Patent [19]

Masterman

[11] Patent Number: 4,806,812
[45] Date of Patent: Feb. 21, 1989

[54] ALTERNATING-CURRENT ELECTRICAL GENERATOR

[75] Inventor: John M. Masterman, Cheltenham, England

[73] Assignee: Dowty Fuel Systems Limited, England

[21] Appl. No.: 668,757

[22] Filed: Nov. 6, 1984

[30] Foreign Application Priority Data

Nov. 18, 1983 [GB] United Kingdom ............... 8330896

[51] Int. Cl.⁴ .............................................. H02K 3/00
[52] U.S. Cl. .................................... 310/182; 310/184; 310/197; 310/156; 310/254
[58] Field of Search ................................ 310/198–208, 310/180, 184, 156, 158, 159, 171, 172, 192, 182, 197, 183, 211, 188, 254, 196; 336/73, 77

[56] References Cited

U.S. PATENT DOCUMENTS

| 3,235,761 | 2/1966 | Nohen | 310/216 |
| 3,252,027 | 5/1966 | Korinek | 310/198 |
| 3,535,572 | 10/1970 | De Rugeris | 310/207 |
| 3,979,821 | 9/1976 | Noodleman | 310/156 |
| 4,127,787 | 11/1978 | Auinger | 310/184 |
| 4,144,470 | 3/1979 | Auinger | 310/198 |
| 4,163,915 | 8/1979 | Fong | 310/198 |
| 4,284,919 | 8/1981 | Auinger | 310/198 |

FOREIGN PATENT DOCUMENTS

| 517543 | 2/1940 | United Kingdom . |
| 1060812 | 3/1967 | United Kingdom . |
| 1485154 | 9/1977 | United Kingdom . |

Primary Examiner—R. Skudy
Attorney, Agent, or Firm—Davis, Bujold & Streck

[57] ABSTRACT

An alternating-current electrical generator including a permanent magnet rotor, a toothed stator and at least two non-overlapping windings associated with the teeth of the stator. Each winding is substantially similar to but independent of the other winding or windings. An end of each winding is separated from an adjacent end of an adjacent winding by at least one tooth having thereon a short-circuited low-resistance winding.

2 Claims, 2 Drawing Sheets

ALTERNATING-CURRENT ELECTRICAL GENERATORg

This invention relates to alternating-current electrical generators.

It is an object of this invention to provide an alternating-current electrical generator having at least two windings which are identical but independent the one from another, so that if one fails during operation there will be at least one other winding which can operate or be brought into operation to continue the supply of alternating-current being generated.

Within the scope of the invention are both single-phase alternating-current electrical generators and multi-phase alternating-current electrical generators.

According to this invention, an alternating-current electrical generator includes a permanent magnet rotor, a toothed stator and at least two non-overlapping windings associated with teeth of the stator, each such winding being substantially similar to but independent of the other or others with an end of each winding being separated from an adjacent end of an adjacent winding by at least one tooth having thereon a short-circuited low-resistance winding. The short-circuited low-resistance winding may be a ring such as copper.

Figure 1:
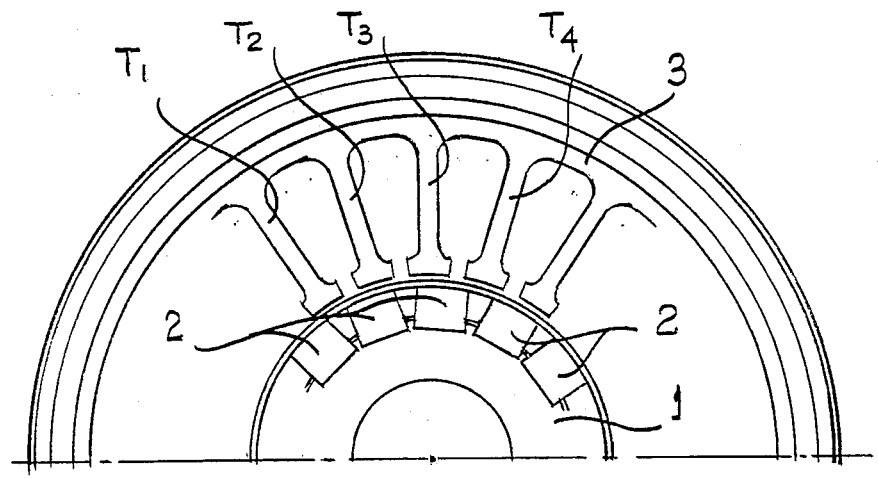
Figure 2:
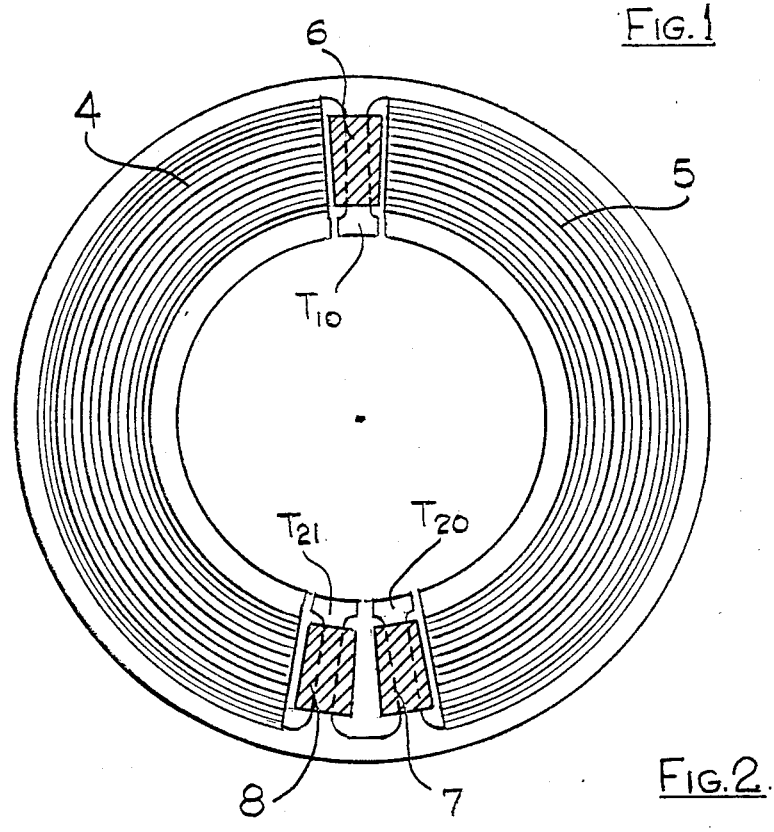
Figure 3:
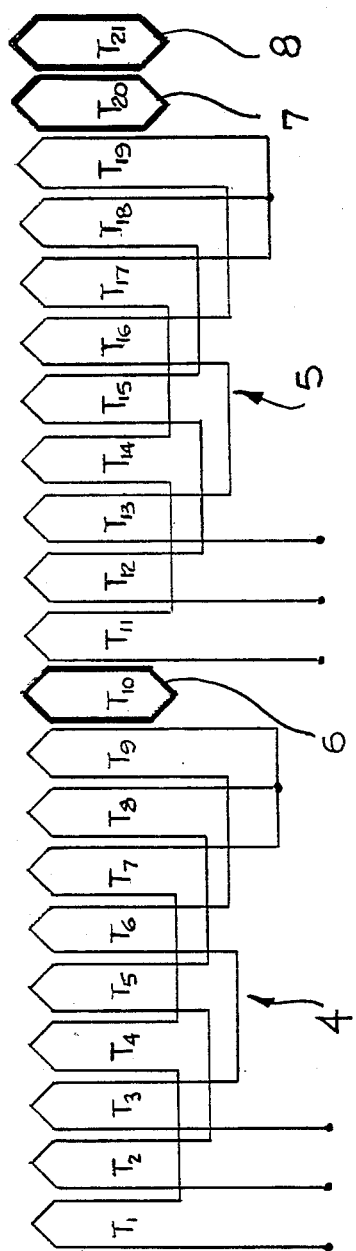

An alternating-current electrical generator in accordance with one embodiment of the invention will now be described by way of example of the invention and with reference to the accompanying drawings, of which FIG. 1 is a plan view of part of the alternating-current electrical generator, with the windings removed, FIG. 2 is a plan view of the stator and windings of the generator (with some teeth removed), and FIG. 3 is a diagram showing the stator windings.

The alternating-current electrical generator is of the three-phase kind and has two identical and independent windings. As shown in FIG. 1, it includes a rotor 1 comprising a number of pole pieces 2 with a stator 3 surrounding it. The stator comprises a yoke which carries twenty-one teeth, T1 to T21, only some of which are shown in FIGS. 1 and 2.

A first three-phase winding 4 is associated with nine adjacent teeth, more clearly shown in FIG. 3 and numbered T1 to T9. A second three-phase winding 5, similar to but independent of the first three-phase winding 4, is associated with another nine adjacent teeth, being those numbered T11 to T19.

An end of the first winding 4 is separated from an end of the second winding 5 by a single tooth namely T10. The other end of the first winding 4 is separated from the other end of the second winding 5 by two adjacent teeth namely T20 and T21.

Each of the teeth T10, T20 and T21 has a short-circuited low-resistance winding, 6, 7 and 8 respectively, formed by a metallic ring such as copper.

In operation, each short-circuited low-resistance winding reduces the so-called 'iron losses' which otherwise would occur in the tooth and in the yoke, because the induced high current will attenuate flux changes in the tooth due to the rotor, to a low value.

I claim:

1. An alternating-current electrical generator including a permanent magnet rotor, a stator having a plurality of teeth, and at least two similar but independent windings associated with the teeth of the stator; each winding has an end which is separated from an adjacent end of an adjacent winding by at least one non wound tooth wherein each non wound tooth is provided with at least one metallic short-circuited winding, independent from the windings of the generator, for reducing the iron losses.

2. A generator as claimed in claim 1, in which said at least one metallic ring short-circuited winding is said ring is made of copper.

* * * * *